(12) United States Patent
Mayerle et al.

(10) Patent No.: US 6,263,977 B1
(45) Date of Patent: Jul. 24, 2001

(54) WINGED AGRICULTURAL IMPLEMENT WITH HEADLANDS CONTROL SYSTEM

(75) Inventors: Dean J. Mayerle; David R. Hundeby, both of Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/428,525

(22) Filed: Oct. 28, 1999

(30) Foreign Application Priority Data

Oct. 30, 1998 (CA) .................................................. 2252276

(51) Int. Cl.$^7$ ............................................... A01B 49/00
(52) U.S. Cl. ............................................................ 172/311
(58) Field of Search .................................. 172/310, 311, 172/464, 456, 634, 637, 776, 466, 501, 662, 452, 458, 461; 111/52–55

(56) References Cited

U.S. PATENT DOCUMENTS

| | | | | |
|---|---|---|---|---|
| 4,206,815 | * | 6/1980 | Hatcher | 172/311 |
| 4,214,637 | * | 7/1980 | Applequist | 172/484 |
| 4,418,762 | * | 12/1983 | Page | 172/311 |
| 4,790,389 | * | 12/1988 | Adee et al. | 172/776 |
| 4,862,758 | * | 9/1989 | Magee | 74/103 |
| 5,687,798 | * | 11/1997 | Henry et al. | 172/311 |
| 5,921,325 | * | 7/1999 | Meek et al. | 172/311 |

* cited by examiner

Primary Examiner—Robert E. Pezzuto
(74) Attorney, Agent, or Firm—Larry W. Miller; John William Stader

(57) ABSTRACT

A headlands control system for a winged agricultural implement includes a headlands actuator operatively connected between implement wing actuators for establishing operation in either of two modes. In the first mode, when the headland actuator is in a first position (e.g. extended), the wing actuators are provided extra downward range to pivot and bias the wing sections downward below horizontal as may occur during operation over uneven ground. In the second mode, when the headland actuator is in a second position (e.g. retracted) and the implement is raised (e.g. at the headlands), the downward range of the implement wings is more limited (as compared with the first mode) at the point where the wing actuators are fully extended. This system thus provides an apparatus for preventing implement wings from drooping in the headland position so the operator is not required to reset the wing control from float mode, or from down pressure mode, depending on what is equipped.

19 Claims, 7 Drawing Sheets

US 6,263,977 B1

WINGED AGRICULTURAL IMPLEMENT WITH HEADLANDS CONTROL SYSTEM

BACKGROUND OF THE INVENTION

This invention relates to winged agricultural implements and, particularly, to means for controlling the range of wing motion permitted in different modes of operation.

Agricultural implements, such as a planters and tillage devices, have increased in operating width, providing winged configurations that fold into a narrow transport orientations for travel over the roadways, yet expand to operating widths of thirty to sixty feet. When these large agricultural implements are operating and come to the end of the field, i.e. the headlands, the implement must be turned around to go back the other direction in the field. At the headlands, it is desirable to raise the ground working devices to an inoperative, non-ground engaging position while making the turn, including those supported on the wings, without requiring the implement to be placed into the transport orientation.

Furthermore, such implements, particularly the tillage implements, are more effective by increasing the force exerted thereby to press the ground working devices into the ground. The actual weight of the implement itself exerts a force to urge the ground working devices into the ground; however, that force can be increased by transferring weight from the tractor through the use of a hydraulic system that works against the tractor hitch to push the implement toward the ground, thereby increasing the force exerted on the ground engaging devices.

U.S. Pat. No. 5,687,798, issued Nov. 18, 1997, to Flexi-Coil Ltd. describes a hydraulic lock mechanism for wing lift cylinders to prevent the wings from drooping when the implement middle section is raised. Co-pending U.S. patent application Ser. No. 08/891,204, corresponding to Canadian Application Serial No. 2,210,238, filed by Flexi-Coil Ltd. describes a down-force system for the tool bar of an agricultural machine including a hydraulic mechanism for maintaining a constant down-force on the rear of the tool bar during operation.

SUMMARY OF THE INVENTION

It is an object of this invention to prevent foldable implement wings from drooping in the headland position.

It is an advantage of this invention that the operator is not required to reset the wing control from float mode, or from down pressure mode, depending on how the implement is equipped.

The invention in one aspect provides an agricultural implement including a frame having a pair of wings pivotally mounted thereon for pivotal movement between raised transport positions and lowered working positions, each said wing having a wing actuator connected thereto for affecting said pivotal motion, and a headlands control system including a headlands actuator for providing first and second positions enabling operation in either of two modes such that:

(A) when the headlands actuator is in the first position as during a ground working operation, the wings are provided with sufficient downward range to enable the wings to be pivoted downward below horizontal as may be required during operation over uneven ground; and (B) when the headlands actuator is in the ;econd position as when the implement is raised at the field headlands, the downward range of pivotal motion of the implement wings is limited in such manner as to assist in preventing excess wing drooping and providing adequate wing-to-ground clearance as when turning the implement at the field headlands.

In one form of the invention the headlands actuator is hydraulically connected in parallel with the implement lift circuit and retracts when the implement is raised at headlands. This prevents wing droop when the wing actuators are operating in float mode or operating in a wing down pressure mode. The actuator system can be used on implements having down pressure and also on those without, in which wing float mode is typically used during operation.

In the preferred embodiment, the wing actuators are either set to float mode or down pressure mode during operation. Alternately a wing float mode can be achieved by using the actuator system in other ways, at least two of which are the following:

a) linkage connections between the actuator system and wing actuators may be arranged to allow some relative movement for floating and to then carry the weight of the wings when the linkage is retracted, thus a float mode setting on the tractor is not required; and b) the actuator system may be set to float mode with an alternate circuit, with no need for the wing actuators to be in float mode.

These and other objects, features and advantages are accomplished according to the invention by a headlands control system for a winged agricultural implement that includes a headlands actuator operatively connected between implement wing actuators for establishing operation in either of two modes. In the first mode, when the headland actuator is in a first position (e.g.extended), the wing actuators are provided extra downward range to pivot and bias the wing sections downward below horizontal as may occur during operation over uneven ground. In the second mode, when the headland actuator is in a second position (e.g. retracted) and the implement is raised (e.g. at the headlands), the downward range of the implement wings is more limited (as compared with the first mode) at the point where the wing actuators are filly extended. This system thus provides means for preventing implement wings from drooping in the headland position so the operator is not required to reset the wing control from float mode, or from down pressure mode, depending on what is equipped.

DETAILED DESCRIPTION OF THE PREFERRED EMBODIMENT

Figure 1:
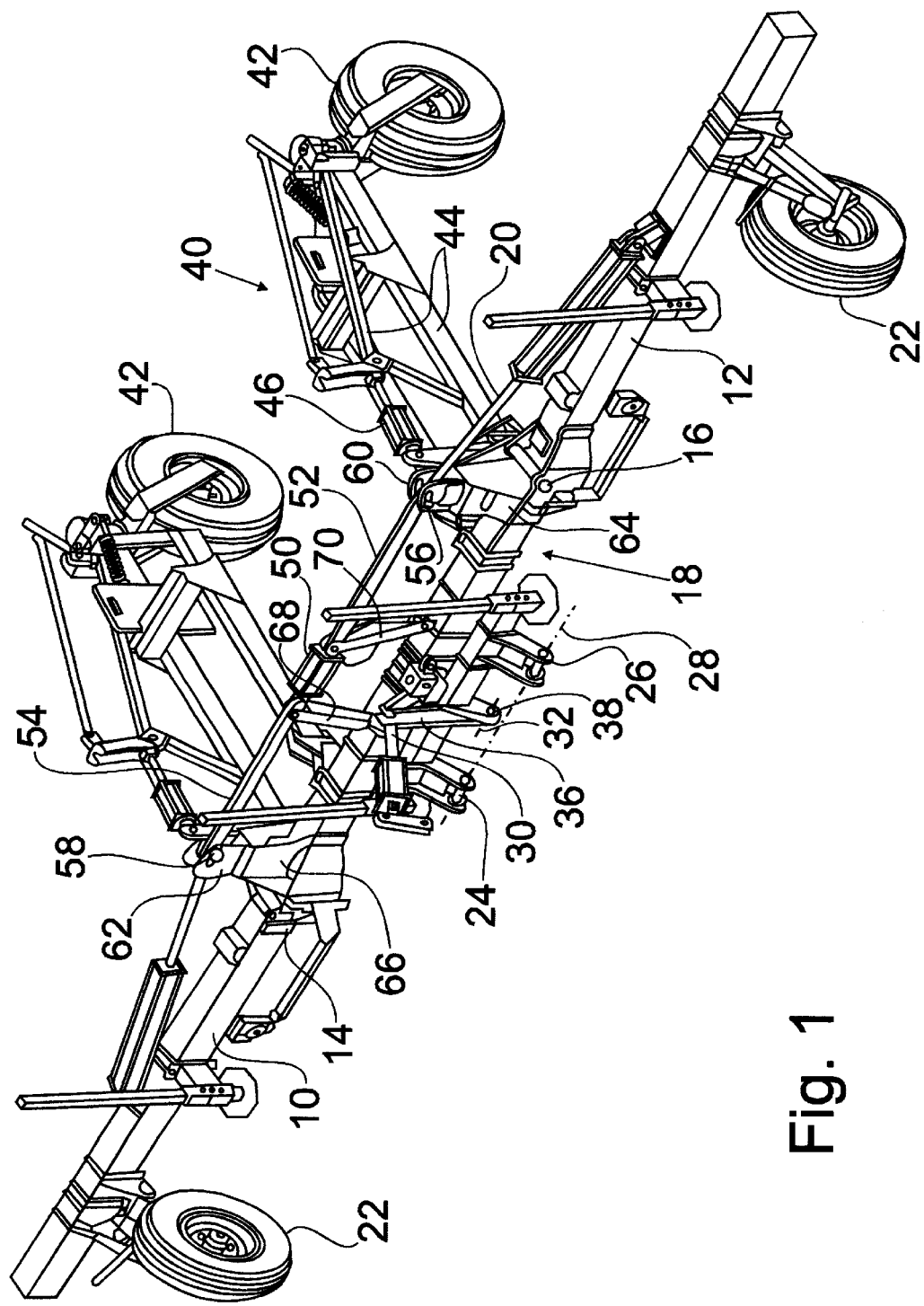
FIG. 1 shows a perspective view of a winged implement in which the actuator system is incorporated.

Referring to FIG. 1, a first embodiment of the implement has wing sections 10 and 12 pivotally attached via joints 14 and 16 to a frame middle section 18 for carrying suitable ground working tools (not shown), which joints each have an axis that is oriented generally horizontal in the working position so that the wing sections are allowed pivotal movement over uneven ground. In the headland position shown in FIG. 1, the wing sections 10 and 12 are supported generally horizontally over the ground, suspended from the middle section 18 by their joints and by hydraulic wing actuators 20. No other means is supporting the wings in this position. When lowered to a working position, gauge wheels 22 support each wing above the ground. The gauge wheels 22 can be adjusted to set the working height above the ground for each wing section. The wing can thereby float (pivot freely) to follow ground contours, or it may be biased toward the ground, and the gauge wheel 22 will limit the downward motion. Downward biasing may be required in soil conditions in which ground engaging tools do not penetrate to the desired depth as set by the gauge wheel and the gauge wheel and wing section is suspended off the ground by the ground tools.

Points 24 and 26 for attachment to a three-point hitch are provided on the middle section 18 for towing and for controlling the height of the middle section. (Alternately the invention would work on implements having ground wheel means to support the middle section, with a floating or fixed hitch for towing). The hitch of the implement shown is particularly suited for connection to the three-point hitch of an aircart having double acting lower link actuators. Most three-point hitches on tractors or other implements provide only lifting action by the lower links and allow free upward movement of the links. The lower links of the aircart can be maintained in a fixed position. The implement middle section 18 is pivotally attached to the aircart lower links by connections at points 24 and 26 allowing the implement movement about a horizontal transverse axis 28.

A hydraulic top link 30 is pivotally connected at one end to the aircart (offset from the axis of the lower links), and at the second end is pivotally connected to the implement middle section 18 at a point offset from the horizontal axis 28. An intermediate link 32, is connected between the second end of the top link and the implement middle section by pivotal connections on both ends. The implement is allowed free downward pivotal movement about the horizontal axis 28 (limited by the length of the actuator and link 32, and by rear support assembly 40) but upward pivotal movement is limited by an abutment 36 along the intermediate link 32. The implement middle section 18 abuts the intermediate link at abutment 36 and the top link 30 reacts to the upward pivotal movement.

Figure 1A:
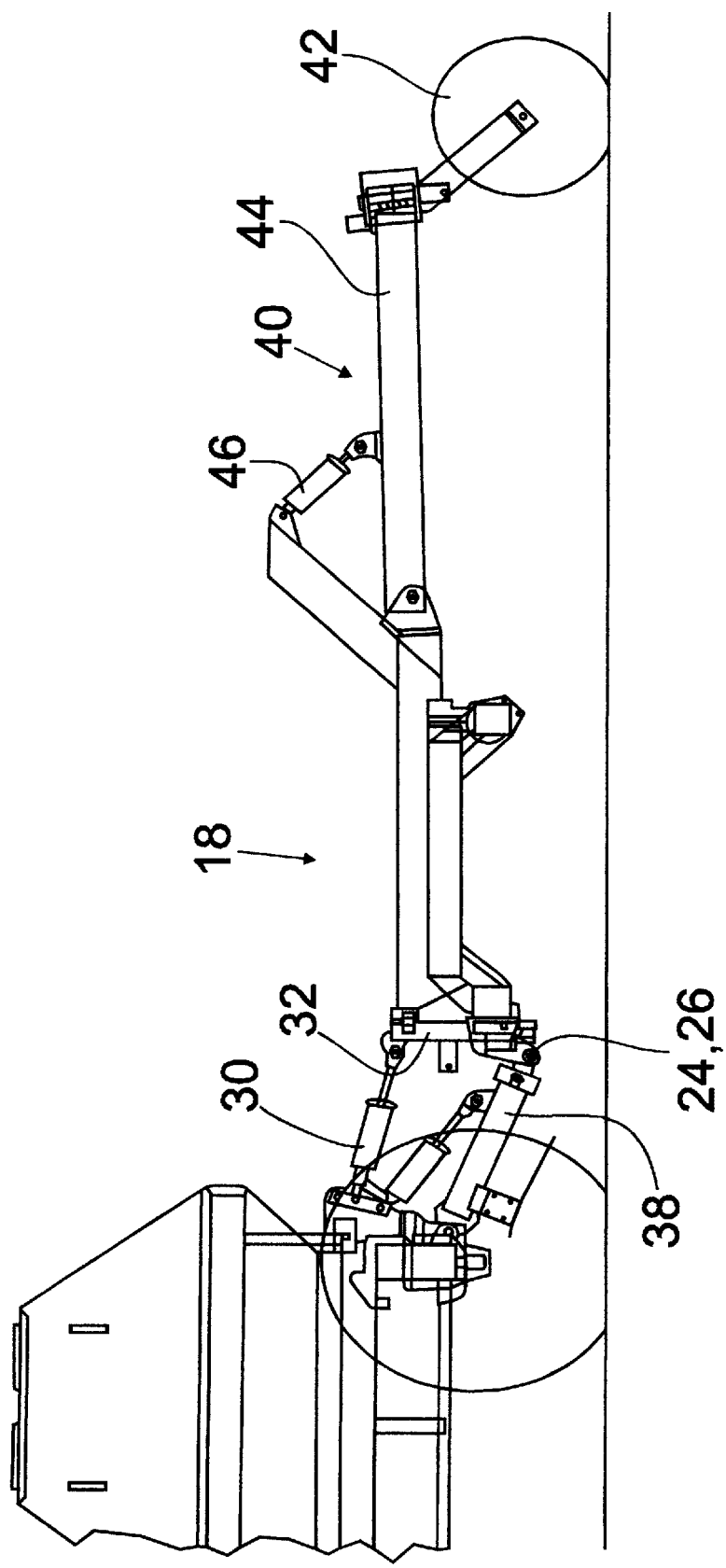
FIGS. 1A and 1B show in diagrammatic fashion the manner in which the implement is attached to the three point hitch of an aircart.
Figure 1B:
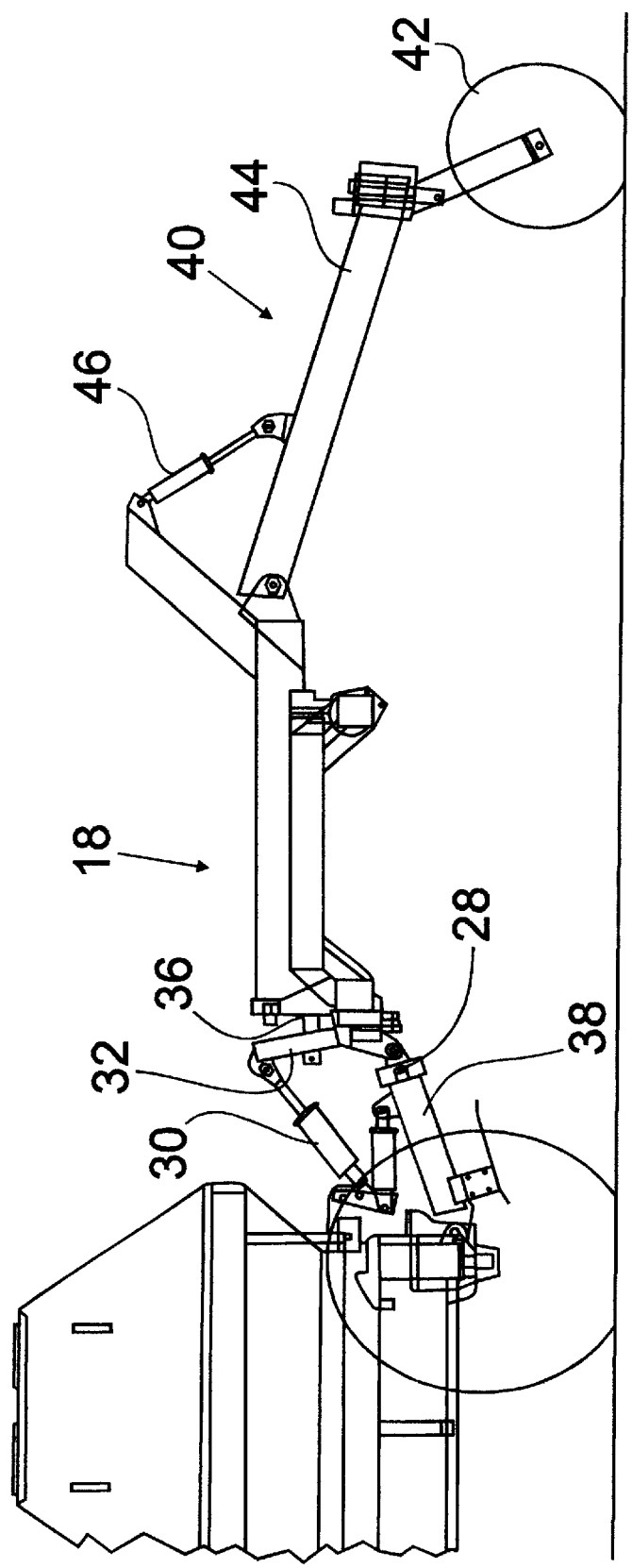

FIGS. 1A and 1B help to illustrate the above and they show the implement connected to an aircart by the preferred 3 point hitch with hydraulic top link 30 and intermediate link 32 in both working and raised positions. This shows how there is freedom of pivoting in the raised position, even though the top link 30 may be locked out, and therefore rigid. The intermediate link 32 is drawn away from the abutment 36, not by the top link but by the system geometry and during the raising action from the lower links 38 and rear support assembly 40. Rear support assembly 40 is well known per se and each includes a castored ground wheel 42 connected by linkages 44 to frame middle section 18. Actuator 46 effects movement of the linkages 44 during raising and lowering in a well known fashion.

Alternately a rigid top link (not shown) may be connected directly between the aircart and the implement, as in a conventional 3 point hitch. This is used on implements not having rear support assembly 40, so the rotation of the frame middle section 18 about the horizontal axis 28 is controlled, maintaining a generally constant relative orientation between the implement and the aircart as the implement is raised or lowered.

When a rear lift support assembly 40 is provided on the implement, a compressible top link is required so that the implement is allowed pivotal movement about axis 28. This may be a spring connected directly to the implement or via an abutting intermediate link 32. In the preferred embodiment the required compressible link is a hydraulic top link operated by a biasing pressure and an intermediate link is also provided to create freedom to pivot in the transport position when hydraulic flow to the top link is blocked.

The top link 30 is locked out of the circuit by valve 48 (FIG. 4) when the implement is raised (by rear lift means and lower arms of hitch) and the link 32 pivots away from the frame middle section so it no longer abuts the frame. The geometry between the lower links 38 and top link 30 causes this action. This allows pivoting of the implement relative to the aircart about horizontal axis 28 when in transit over uneven ground.

Referring further to the embodiment of FIG. 1, the headland actuator system includes a headlands cylinder 50, having its opposite ends pivotally attached to elongated center links 52 and 54. The outer ends of links 52 and 54 are secured by pins 56, 58 to the inner ends of the wing actuators 20 and these pins are disposed for movement in slots 60 and 62 formed in the upper ends of spaced towers 64, 66 fixed to the frame middle section 18. The headlands cylinder 50 is stabilized by means of stabilizing links 68, 70 having upper ends connected at opposing ends of the cylinder 50 and their lower ends pivoted to the middle section 18 of the implement frame. Thus, as cylinder 50 is extended and retracted, the inner ends of the wing actuators 20 are caused to travel along the paths defined by slots 60, 62 between the inner and outer extremities of these slots. (In an alternative arrangement an extra long headlands actuator could be used with its opposing ends being directly connected to the inner ends of the wing actuators 20 and eliminating the need for links 52 to 70 described above).

Figure 2:
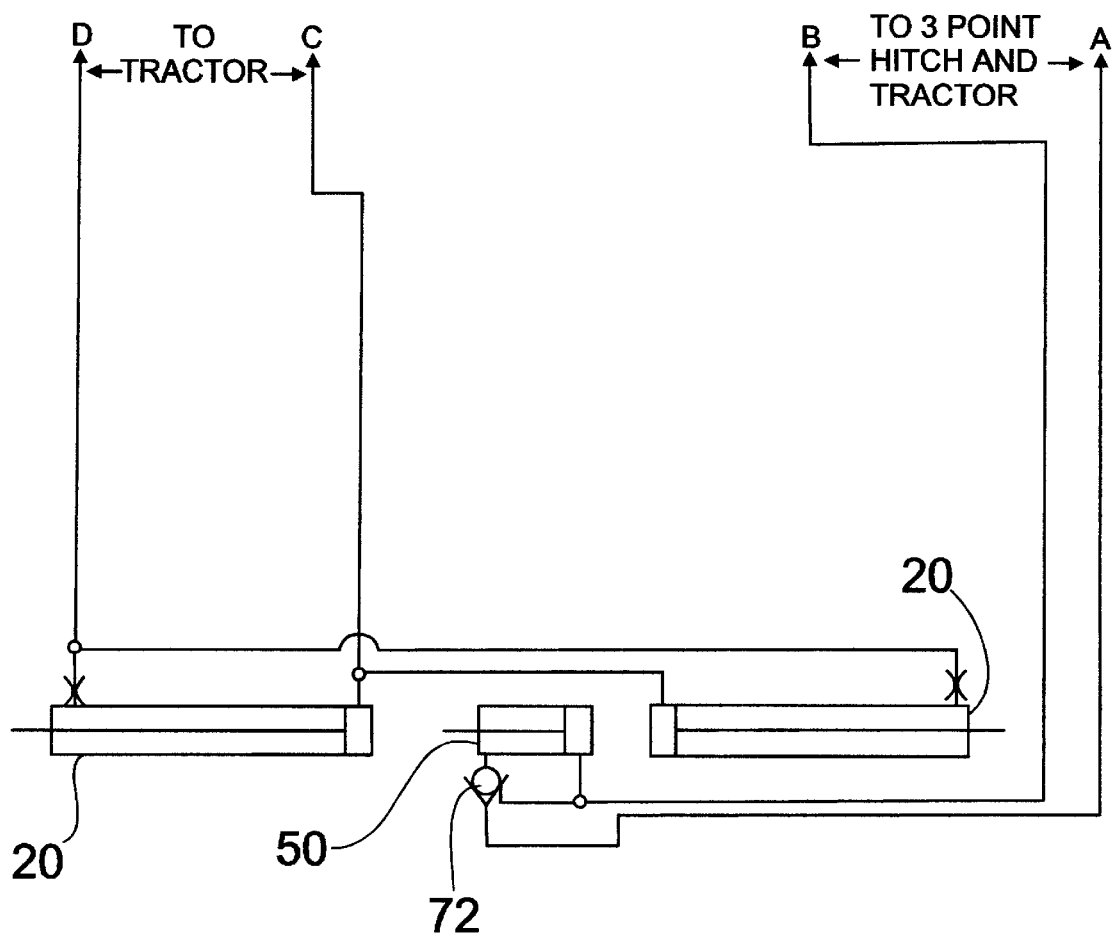
FIG. 2 shows a simple wing lift circuit, i.e. without down pressure capability with the actuator connected to the implement lift circuit.

In operation without down pressure, (FIG. 2) the wing lift circuit CD can be set to float mode in the tractor when the implement wings 10 and 12 have been lowered from their transport position. After the implement is lowered to the ground, continued flow into line B builds pressure to further operate the implement lift actuators until the depth stop (not shown) is reached. During this period pressure in line B causes pilot-to-open check valve 72 to open to allow flow from the rod end of the cylinder 50, and the headlands system is extended by pressure in line B. This forces the ends of the wing actuators 20 to the outer ends of slots 60 and 62 for extra downward pivotal range of the wings 10 and 12.

The actuators 20 are held at the outer ends of slots 60 and 62 during operation in the working position. When raising the implement at headlands the cylinder 50 is retracted. This limits droop of the wings when the middle section 18 is raised by applying pressure to line A. The implement is typically raised just enough for working tools to clear the ground for turning at the field headlands. The pilot-to-open check 72 prevents fluid from escaping from the cylinder 50 to the rear or front lift actuators which may be extended only to an intermediate position at headlands. The check valve 72 also limits the droop of the wings 10 and 12 until the implement is lowered to the ground and line B is pressurized, repeating the cycle above.

To raise the wings to transport position, the implement is first raised. Pressure is applied to line A, retracting the cylinder 50 and at the same time operating the three point hitch actuators (and rear lift actuators if present) which raise the middle section 18. After the middle section 18 is raised, pressure is applied to line D and the wing actuators 20 rotate wings 10 and 12 to a generally vertical position for transport. The ends of the wing actuators 20 are held at the inner ends of slots 60 and 62 by the cylinder 50. In this held position the headlands actuator motion is completely restricted so that motion of one wing may not be transmitted to the opposite wing through the linkage system when the wings are being raised. Otherwise the wings could freely toggle side to side in the vertical position until they came to rest against some other abutment. Alternately the slots 60 and 62 could be replaced by links pivotally connected to the middle section 18 and end of the wing actuator providing the link's rotation is limited by stops corresponding to the inner ends of the slots of the present embodiment.

In operation with down pressure, (see the hydraulic circuits of FIGS. 3 or 4) the operation of the headlands system is the same. The wing lift circuit may be set to down pressure mode by setting the valve in the tractor to pressurize line C. The down pressure circuit to the wings may be connected in combination with the hydraulic top link 30, or may act alone as in the case of a rigid top link.

A hydraulic top link not connected to a down pressure circuit is known in the prior art for adjusting the angle of an implement relative to a tractor, and remains fixed as a rigid link during operation.

Ball valve 74 (FIGS. 3 or 4) is closed when wings 10 and 12 are raised to the transport position. This allows full tractor pressure to be applied to wing actuators 20 to lower the wings which generally rest past an overcenter position in transport (generally vertical). The ball valve 74 is controlled by a cam or link mechanism so that it is open when the wing position is lower than about 15 degrees up from horizontal as described in the above-noted U.S. patent.

Figure 3:
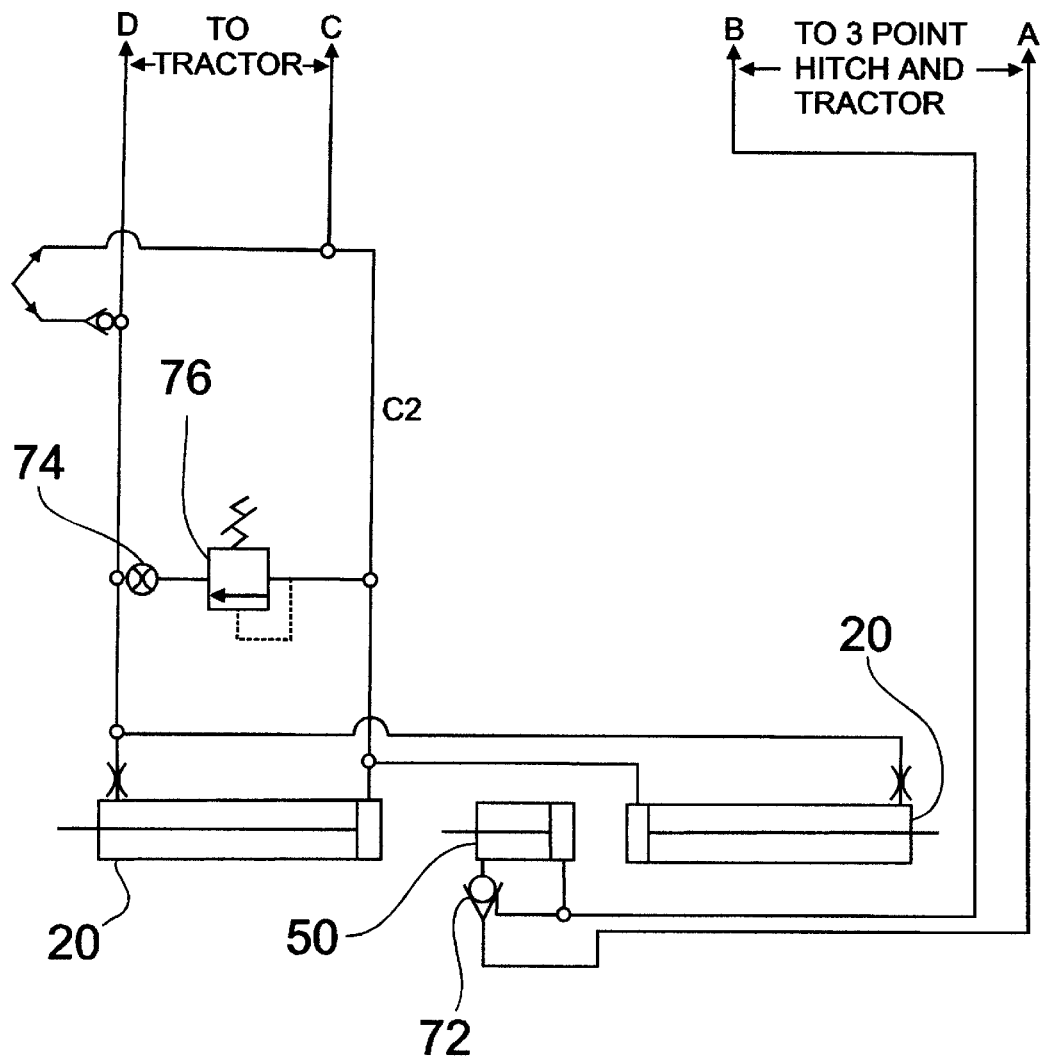
FIG. 3 shows a wing lift circuit with down pressure control in combination with the actuator system.
Figure 4:
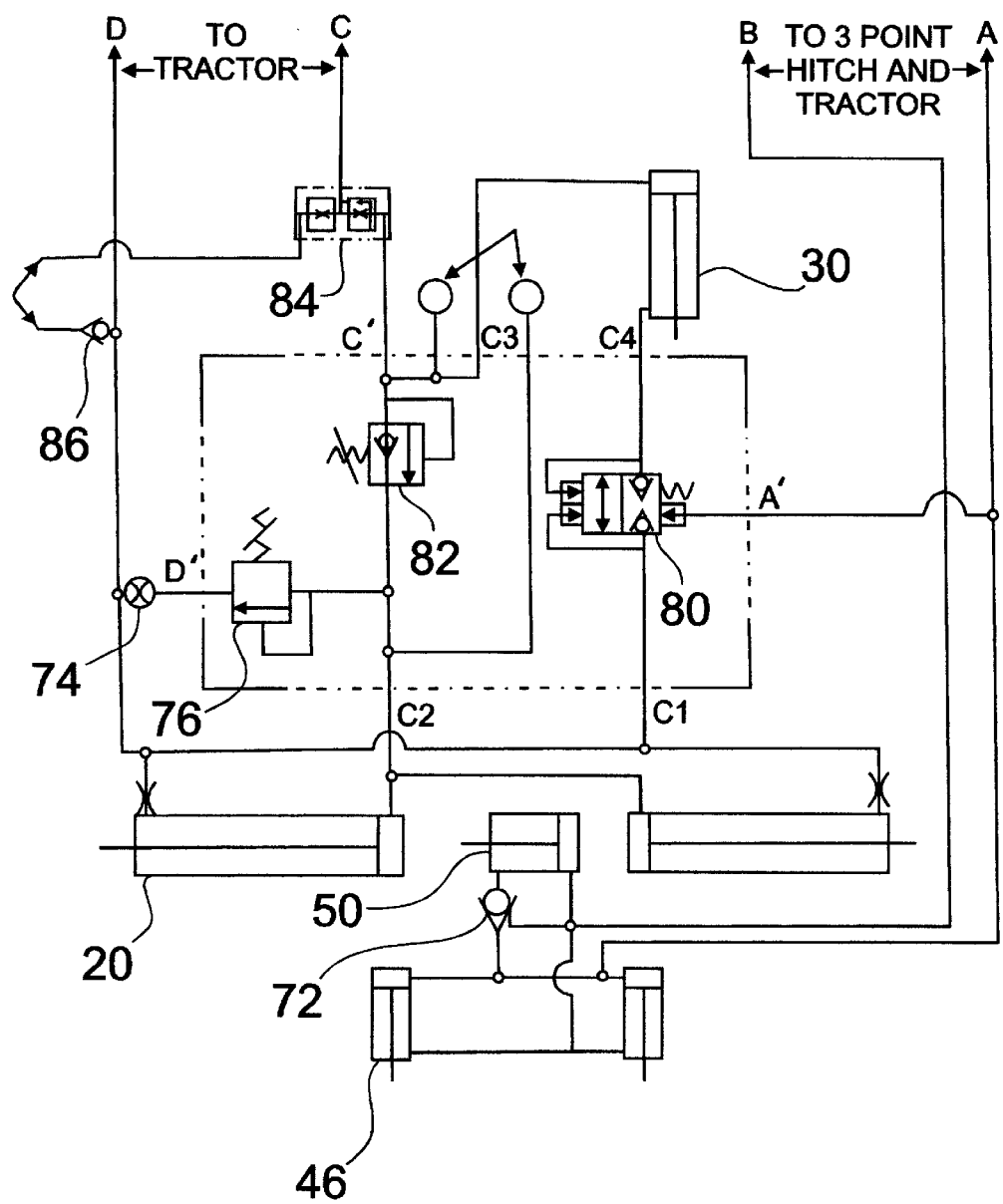
FIG. 4 shows a further hydraulic circuit with additional top link down pressure and wherein the wing down pressure and top link down pressure are controlled separately.

Referring to FIGS. 3 and 4, wing down pressure is controlled by relief valve 76, which limits the pressure in line C2. This relief valve allows fluid to return through line D when pressure in line C2 exceeds the setting. An optional top link actuator may also be connected to line C2 via line C', and pressure to both, the wing actuators and the top link actuator may be controlled by valve 76.

With particular reference to FIG. 4, valve 80 is provided when connecting a hydraulic biasing top link to lockout the top link biasing function when the implement is being raised. When the implement is lowered to the set working height there is no pressure in line A or to pilot A', and valve 80 will open with, any pressure at C4 or C1 to allow the top link to extend or retract with the biasing function.

A second relief valve 82 (FIG. 4) may be added to the circuit to control the top link pressure separately. This valve may be set at pressures greater than that of relief valve 76 to create a differential pressure between lines C2 and C'.

The valve 82 allows pressure in C' to build higher, before continuing into line C2, where relief valve 76 will control the pressure in that part of the circuit.

This type of down pressure circuit described above which uses relief valves or pressure regulating valves rather than PRRV (pressure reducing—relieving valve) controls is preferred when connecting to tractors having C(CLS (closed center-load sensing) controls. The tractor valve controlling this circuit is preferably set to deliver 3 gpm, which generally satisfies the rate at which the various, actuators respond to uneven ground. This set flow will continuously pass through circuit CD during operation of down pressure, and be used as required by the actuators when they extend or retract as they provide bias to force the middle section 18 and/or wing sections 10 and 12 toward the ground.

A flow divider 84 can be used to separate equal portions of flow when a second circuit is connected to the same control valve. In this case the tractor valve may be set to 6 gpm. A 50/50 divider will split 3 gpm to each circuit regardless of the pressure at which either circuit is operation. In the embodiment shown in FIG. 4, the second circuit operates hydraulic drives for metering seed or other materials for planting. A check valve 86 in the second circuit blocks reverse flow to the second circuit so that full pressure may be applied to the wing actuators when raising the wings. Depending on the ratio of flow required by the branch circuits, a flow divider with a different split ratio could be used. Or a priority flow divider could be used which sets a fixed flow to one branch and delivers any excess flow to the other. Other multiple number of branch circuits is conceivable by using primary and secondary flow dividers and so on.

The invention may be otherwise embodied. For example, implements may be constructed with two or three sections. FIG. 1 shows a three section implement. A two section version does not have a middle section on which working tools are attached. In this version, there is no physical space to locate a central actuator cylinder and linkage as described. So alternately, an additional cylinder could be connected between each wing and wing actuator to change the range of motion between working positions and raised headland positions.

Figure 5:
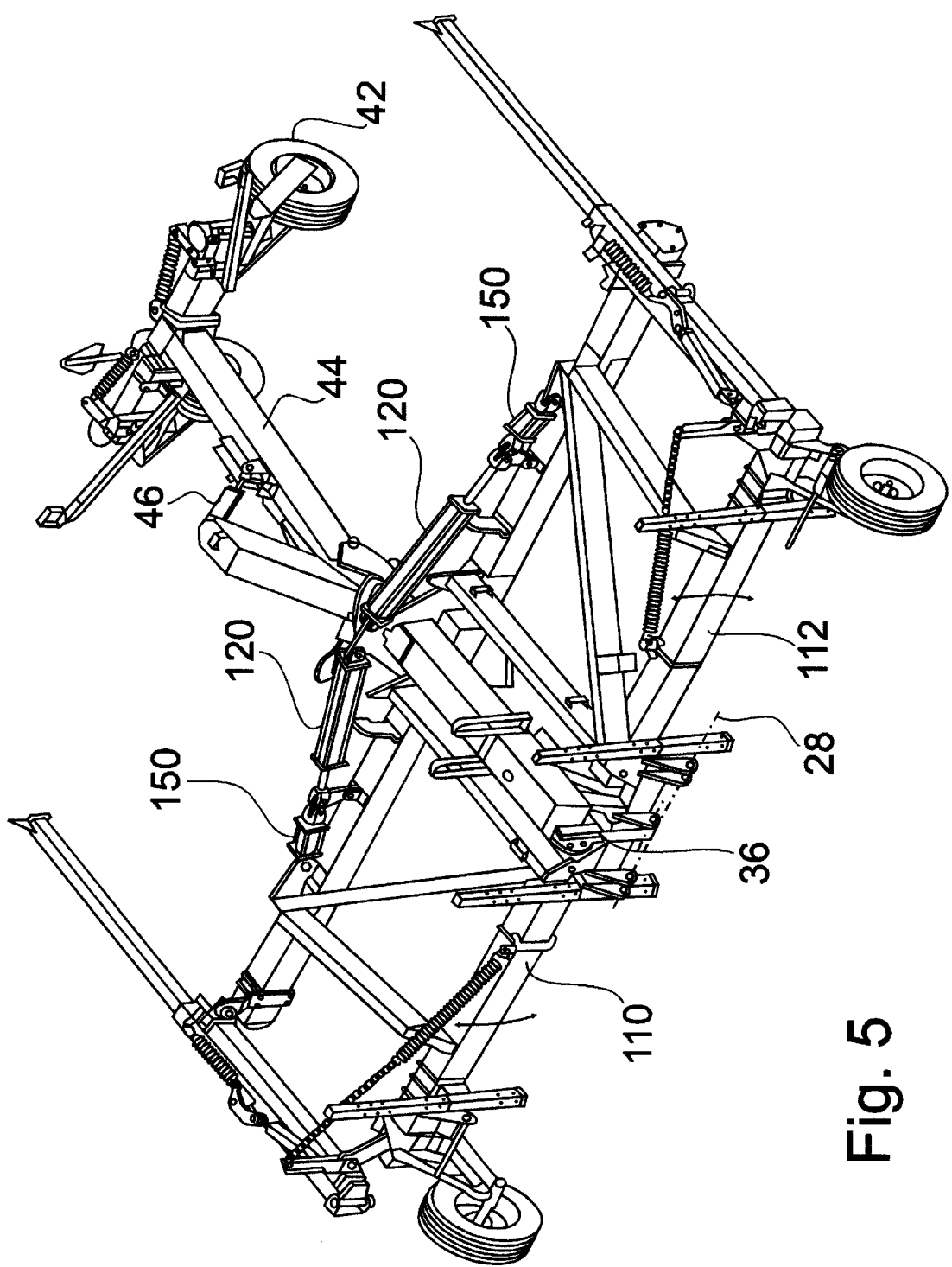
FIG. 5 is a perspective view of a further form of winged implement employing the invention.

FIG. 5 shows a winged implement without a center section 18 as described above. Wing actuators 120 are arranged mechanically in series with headland actuator cylinders 150 to achieve the effect described above. With headland cylinders 150 extended, the wings 110, 112 are allowed an extra range ol motion below horizontal. When lifting the implement at headlands, headland cylinders 150 are retracted to limit the range of wing motion so they do not droop much lower than horizontal when the wing actuators are fully extended. The wing actuators can then be left in float mode when raising the implement at headlands (or down pressure mode, depending on what the equipment is) similar to that described previously with reference to FIGS. 1–4.

Preferred embodiments of the invention have been described and illustrated by way of example. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

Having thus described the invention, what is claimed is:

1. An agricultural implement including a frame having a pair of wings pivotally mounted thereon for pivotal movement between raised transport positions and lowered working positions, each said wing having a wing actuator connected thereto for effecting said pivotal movement of said wings, and a headlands control system including a headlands actuator connected to both of said wing actuators and being movable between first and second positions enabling operation in either of two modes such that:

(A) when the headlands actuator is in the first position as during a ground working operation, said headlands actuator moving said wing actuators to a lower working position so that the wings are provided with sufficient downward range to enable the wings to be pivoted downward below horizontal as may be required during operation over uneven ground, and (B) when the headlands actuator is in the second position as when the implement is raised at the field headlands, said headlands actuator providing a higher working position for said wing actuators so that the downward range of pivotal motion of the implement wings is limited in such manner as to assist in preventing excess wing drooping and providing adequate wing-to-ground clearance as when turning the implement at the field headlands.

2. The agricultural implement of claim 1 when adapted for connection to a hydraulic implement lift circuit with said headlands actuator being hydraulically connected in parallel with said lift circuit when in use to effect movement thereof between the first and the second positions when the implement is lowered and raised respectively.

3. The agricultural implement of claim 2 including a wing lift circuit connected to said wing actuators which can, when connected to tractor hydraulics during use, provide a free floating mode for said wings when lowered to the ground working position.

4. The agricultural implement of claim 2 including a wing lift circuit connected to said wing actuators which can, when connected to tractor hydraulics during use, apply a controlled degree of down pressure via said wing actuators when the wings are in the ground working position.

5. The agricultural implement of claim 4 wherein a hydraulic top link actuator is secured to said implement frame to apply down pressure thereto, said hydraulic top link being connected in a branch of said wing lift circuit, and pressure control valves for controlling the down pressures exerted by said wing and said top link actuators.

6. The agricultural implement of claim 5 including a valve to disable the application of down pressure by the top link actuator when the implement lift circuit is activated to raise the implement.

7. The agricultural implement of claim 5 wherein said pressure control valves are pressure relief valves.

8. An agricultural implement comprising:

a frame having a pair of wings pivotally mounted theron for pivotal movement between raised transport positions and lowered working positions, each said wing having a wing actuator connected thereto which is extendable and retractable for effecting pivotal motion; and a headlands control system including a headlands actuator connected to both of said wing actuators by a pin movable through a slotted bracket between a first outer position and a second inner position defined by said slotted bracket so as to enabling operation of said wing actuators in either of two modes such that:

(A) when the headlands actuator is in the first outer position as during a ground working operation, the wings are provided with sufficient downward range to enable the wings to be pivoted downward below horizontal as may be required during operation over uneven ground, and (B) when the headlands actuator is in the second inner position as when the implement is raised at the field headlands, the downward range of pivotal motion of the implement wings is limited in such manner as to assist in preventing excess wing drooping and providing adequate wing-to-ground clearance as when turning the implement at the field headlands.

9. The agricultural implement of claim 8 when adapted for connection to a hydraulic implement lift circuit with said headlands actuator being hydraulically connected in parallel with said lift circuit when in use to effect movement thereof between the first and the second positions when the implement is lowered and raised respectively.

10. The agricultural implement of claim 9 including a wing lift circuit connected to said wing actuators which can, when connected to tractor hydraulics during use, apply a controlled degree of down pressure via said wing actuators when the wings are in the ground working position.

11. The agricultural implement of claim 9 including a wing lift circuit connected to said wing actuators which can, when connected to tractor hydraulics during use, provide a free floating mode for said wings when lowered to the ground working position.

12. The agricultural implement of claim 10 wherein a hydraulic top link actuator is secured to said implement frame to apply down pressure thereto, said hydraulic top link being connected in a branch of said wing lift circuit, and pressure control valves for controlling the down pressures exerted by said wing and said top link actuators.

13. The agricultural implement of claim 12 including a valve to disable the application of down pressure by the top link actuator when the implement lift circuit is activated to raise the implement.

14. The agricultural implement of claim 13 wherein said pressure control valves are pressure relief valves.

15. The agricultural implement of claim 8, wherein said implement includes a hydraulic system responsive to the lifting of at least a portion of the implement at the headlands, said headlands actuator being connected to said hydraulic system to cause the headlands actuator to assume the second position upon said lifting of the implement in a headland position.

16. The agricultural implement of claim 15 wherein said wing actuators are connected to said hydraulic system in such manner that the implement wings are free to float after the implement has been lowered to the ground working position.

17. The agricultural implement of claim 15 wherein said wing actuators are connected in a portion of said hydraulic system and said portion of the hydraulic system is adapted to supply fluid at desired pressures to said wing actuators to maintain same in a down pressure mode after the implement has been lowered to the ground working position.

18. The agricultural implement of claim 15 wherein said headlands control system includes linkages between said headlands actuator and said wings providing a degree of freedom enabling said wings to float when the implement is in a lowered ground working position.

19. The agricultural implement of claim 18 wherein said linkages are arranged such that said degree of freedom is absent when said wings are in raised transport conditions to avoid toggling motion of the wings during transport.

* * * * *